United States Patent
Son et al.

(10) Patent No.: US 11,125,323 B2
(45) Date of Patent: Sep. 21, 2021

(54) ABNORMALITY DIAGNOSING DEVICE AND ABNORMALITY DIAGNOSING METHOD FOR SELECTION SOLENOID VALVE OF AUTOMATIC TRANSMISSION

(71) Applicants: JATCO Ltd, Fuji (JP); NISSAN MOTOR CO., LTD., Yokohama (JP)

(72) Inventors: Ken Son, Atsugi (JP); Seiji Kasahara, Atsugi (JP)

(73) Assignees: JATCO LTD, Fuji (JP); NISSAN MOTOR CO., LTD., Yokohama (JP)

( * ) Notice: Subject to any disclaimer, the term of this patent is extended or adjusted under 35 U.S.C. 154(b) by 33 days.

(21) Appl. No.: 16/641,562

(22) PCT Filed: Aug. 28, 2018

(86) PCT No.: PCT/JP2018/031638
§ 371 (c)(1),
(2) Date: Feb. 24, 2020

(87) PCT Pub. No.: WO2019/044789
PCT Pub. Date: Mar. 7, 2019

(65) Prior Publication Data
US 2020/0182352 A1 Jun. 11, 2020

(30) Foreign Application Priority Data
Sep. 1, 2017 (JP) .............................. JP2017-168384

(51) Int. Cl.
*F16H 61/12* (2010.01)

(52) U.S. Cl.
CPC ... *F16H 61/12* (2013.01); *F16D 2500/10412* (2013.01); *F16D 2500/30415* (2013.01);
(Continued)

(58) Field of Classification Search
CPC .. F16H 61/12; F16H 2061/1264; F16H 59/42; F16D 2500/10412; F16D 2500/30415; F16D 2500/30426
(Continued)

(56) References Cited

U.S. PATENT DOCUMENTS 4,967,620 A * 11/1990 Shimanaka ......... F16H 61/0437
477/155
5,522,779 A * 6/1996 Tabata ................ F16H 61/0246
477/126
(Continued)

FOREIGN PATENT DOCUMENTS

JP 2007170525 A * 7/2007 ............. F16H 61/12
JP 2010-265910 A 11/2010

OTHER PUBLICATIONS

English translation of JP2010265910A; http://translationportal.epo.org; Jan. 13, 2021 (Year: 2021).*

*Primary Examiner* — Roger L Pang
(74) *Attorney, Agent, or Firm* — Foley & Lardner LLP

(57) ABSTRACT

Selection solenoid valve (75) controls engagement/disengagement of travel clutch (31, 32) in synchronization with a selecting operation of selector lever (90) that selects a range position of belt-type continuously variable transmission (CVT). Selection solenoid valve abnormality diagnosing unit (8a) is configured to, when performing a selecting operation from no-drive range to drive range, if a time required for travel clutch (31, 32) to be judged to be engaged from a start of selection of the drive range is less than a predetermined time, judge selection solenoid valve (75) to be a maximum hydraulic pressure side abnormality. When performing the selecting operation of drive range→no-drive range→drive range, if a selecting operation speed condition indicating that a no-drive range selection time is shorter than a setting time (Tth) is satisfied, execution of abnormality
(Continued)

diagnosis of selection solenoid valve (75) is not permitted. With this configuration, misjudgment is prevented.

6 Claims, 8 Drawing Sheets

(52) U.S. Cl.
CPC .............. *F16D 2500/30426* (2013.01); *F16H 2061/1264* (2013.01)

(58) Field of Classification Search
USPC .......................................................... 701/62
See application file for complete search history.

(56) References Cited

U.S. PATENT DOCUMENTS

| | | | | |
|---|---|---|---|---|
| 2009/0138162 A1* | 5/2009 | Futamura | ................ | F16H 61/12 |
| | | | | 701/55 |
| 2018/0010685 A1* | 1/2018 | Yuasa | .................... | F16H 61/12 |

* cited by examiner

ABNORMALITY DIAGNOSING DEVICE AND ABNORMALITY DIAGNOSING METHOD FOR SELECTION SOLENOID VALVE OF AUTOMATIC TRANSMISSION

The present invention relates to a device and a method for diagnosing abnormality of a selection solenoid valve that is provided in an automatic transmission and controls engagement/disengagement of a travel clutch in synchronization with a selecting operation of a selector lever that selects a range position of the automatic transmission.

BACKGROUND ART

There are vehicles having a control valve that outputs a control pressure, a continuously variable transmission that performs a shifting operation by a line pressure regulated according to the control pressure and a frictional engagement device whose engagement force is controlled according to the control pressure. And, there is known an abnormality diagnosing device that, when a phenomenon in which an engagement time of the frictional engagement device is equal to or less than a predetermined time is detected in such vehicles, judges that the control valve is in a failure state in which an excessive control pressure is continuously outputted (for example, Patent Document 1).

In a case of the above related art device, when detecting the phenomenon in which the engagement time of the frictional engagement device is equal to or less than the predetermined time, the abnormality diagnosing device judges that the control valve is in the failure state in which the excessive control pressure is continuously outputted. However, in a case where an object of failure judgment is the selection solenoid valve that controls engagement/disengagement of the travel clutch in synchronization with the selecting operation, when a selecting operation of D-range→range except D-range→D-range is done in a short time during vehicle stop, the selection solenoid valve is wrongly judged to be abnormal. The reason of this misjudgment is because a forward clutch is engaged in a short time due to selection of D-range again before oil is completely drained from an oil chamber of a forward clutch pressure. This misjudgment of abnormality of the selection solenoid valve also occurs when a selecting operation of R-range→range except R-range→R-range is done.

An object of the present invention is therefore to prevent the selection solenoid valve from being misjudged to be a maximum hydraulic pressure side abnormality when a selecting operation by which the selector lever crosses a no-drive range is performed in a short time.

CITATION LIST

Patent Document

Patent Document 1: Japanese Unexamined Patent Application Publication No. 2010-265910

SUMMARY OF THE INVENTION

To achieve the above object, the present invention has an automatic transmission, a selection solenoid valve and a selection solenoid valve abnormality diagnosing unit.

The automatic transmission is provided between a travelling driving source and driving wheels.

The selection solenoid valve controls engagement/disengagement of a travel clutch in synchronization with a selecting operation of a selector lever that selects a range position of the automatic transmission.

The selection solenoid valve abnormality diagnosing unit is configured to, if a time required for the travel clutch to be judged to be engaged from a start of selection of a drive range is less than a predetermined time, judge the selection solenoid valve to be a maximum hydraulic pressure side abnormality.

The selection solenoid valve abnormality diagnosing unit is configured such that when performing the selecting operation of "the drive range"→"the no-drive range"→"the drive range in which the travel clutch, which is the same as the travel clutch engaged in the drive range before changing to the no-drive range, is engaged", if a selecting operation speed condition indicating that a no-drive range selection time is shorter than a setting time is satisfied, execution of abnormality diagnosis of the selection solenoid valve is not permitted.

For example, there is a scene in which, during vehicle stop for waiting for a traffic signal or due to traffic jam with D-range selected, a continuous selecting operation of a selector lever of D-range→N-range→D-range is done in a short time by a drive. In this case, since hydraulic pressure is not completely drained in the N-range and a time required for an engagement element to be engaged from a start of selection of N-range→D-range becomes short, the selection solenoid valve is misjudged to be the maximum hydraulic pressure side abnormality.

The inventor focuses attention on this point, in the present invention, when performing the selecting operation of the drive range→the no-drive range→the drive range, if the selecting operation speed condition indicating that the no-drive range selection time is shorter than the setting time is satisfied, execution of the abnormality diagnosis of the selection solenoid valve is not permitted.

As a consequence, when the selecting operation by which the selector lever crosses the no-drive range is performed in a short time, the misjudgment of the maximum hydraulic pressure side abnormality of the selection solenoid valve can be prevented.

EMBODIMENTS FOR CARRYING OUT THE INVENTION

Figure 1:
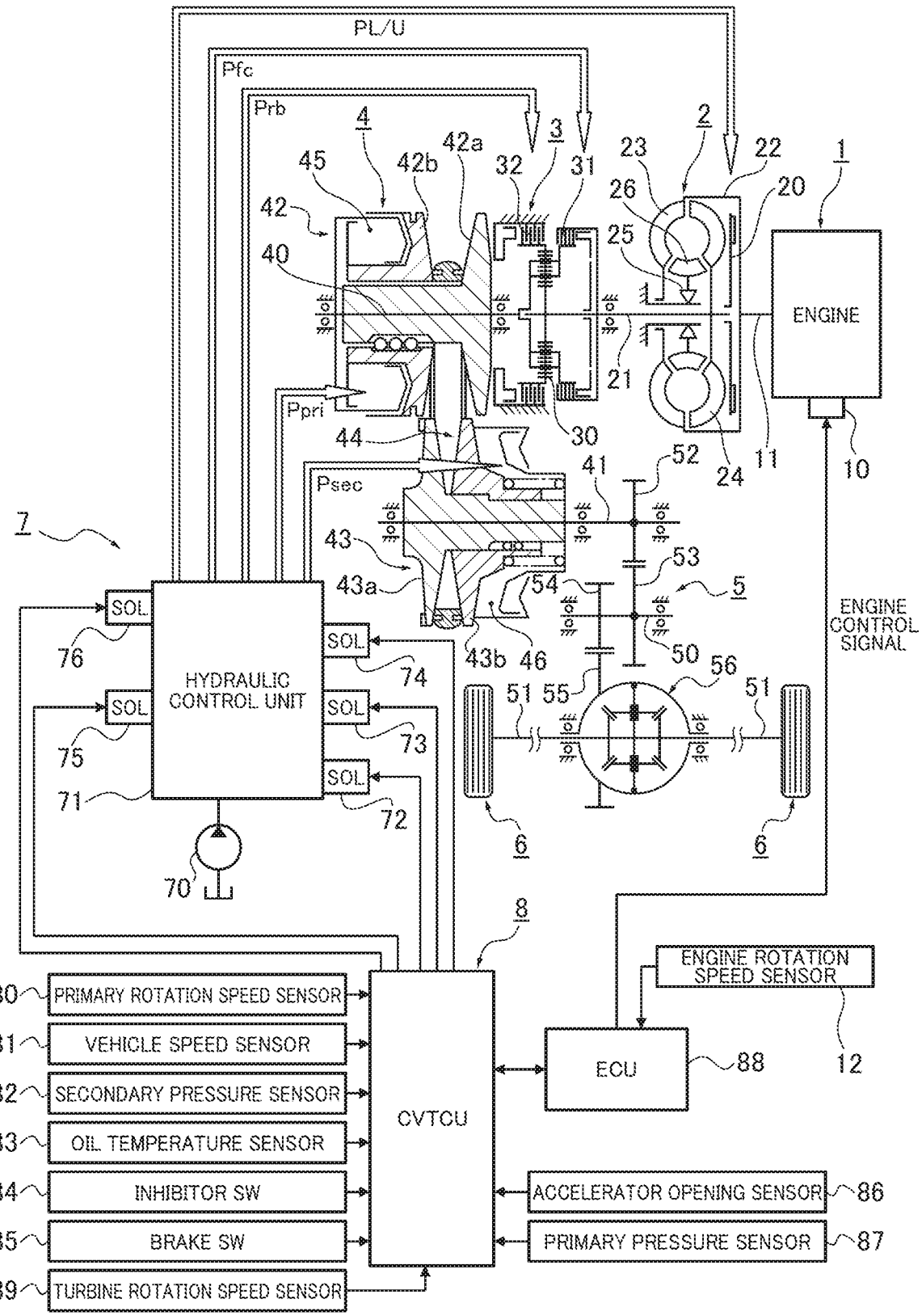
FIG. 1 is a general system diagram showing a driveline and a control system of an engine vehicle that employs a selection solenoid valve abnormality diagnosing device of an automatic transmission according to an embodiment.

In the following description, a best mode for realizing a selection solenoid valve abnormality diagnosing device of an automatic transmission according to the present invention will be explained on the basis of an embodiment shown in the drawings.

First, configurations will be explained.

The selection solenoid valve abnormality diagnosing device of the embodiment is applied to an engine vehicle that mounts therein a belt-type continuously variable transmission (an example of an automatic transmission) configured by a torque convertor, a forward-reverse switching mechanism, a variator and a final speed reduction mechanism. The configurations of the embodiment will be separately explained below by [General system configuration], [Selection solenoid valve abnormality diagnosing device configuration] and [Selection solenoid valve abnormality diagnosing process].

[General System Configuration]

FIG. 1 shows a driveline and a control system of the engine vehicle that employs the selection solenoid valve abnormality diagnosing device of the automatic transmission according to the embodiment. In the following description, the general system configuration will be explained with reference to FIG. 1.

As shown in FIG. 1, the driveline of the engine vehicle has an engine 1, a torque convertor 2, a forward-reverse switching mechanism 3, a variator 4, a final speed reduction mechanism 5 and driving wheels 6, 6. Here, the belt-type continuously variable transmission CVT is formed by accommodating the torque convertor 2, the forward-reverse switching mechanism 3, the variator 4 and the final speed reduction mechanism 5 in a transmission case (not shown).

The engine 1 can be output-torque-controlled by an external engine control signal besides being output-torque-controlled by driver's accelerator operation. The engine 1 is provided with an output torque control actuator 10 that performs an output torque control by a throttle valve opening/closing operation and/or a fuel cut operation etc.

The torque convertor 2 is a starting element by a fluid coupling having a torque increase function and a torque variation absorbing function. The torque convertor 2 has a lock-up clutch 20 that can directly connect an engine output shaft 11 (=a torque convertor input shaft) and a torque convertor output shaft 21 when the torque increase function and the torque variation absorbing function are not required. The torque convertor 2 further has, as components, a pump impeller 23 directly connected to the engine output shaft 11 through a convertor housing 22, a turbine runner 24 directly connected to the torque convertor output shaft 21 and a stator 26 provided at a case through a one-way clutch 25.

The forward-reverse switching mechanism 3 is a mechanism that switches an input rotation direction to the continuously variable transmission mechanism 4 between a forward direction for forward travel and a reverse direction for reverse travel. This forward-reverse switching mechanism 3 has a double-pinion type planetary gear mechanism 30, a forward clutch 31 formed by a plurality of clutch plates and a reverse brake 32 formed by a plurality of brake plates. The forward clutch 31 is engaged by a forward clutch pressure Pfc when selecting a forward drive range such as D-range. The reverse brake 32 is engaged by a reverse brake pressure Prb when selecting a reverse drive range such as R-range. Here, when selecting N-range (neutral range), by draining the forward clutch pressure Pfc and the reverse brake pressure Prb, the forward clutch 31 and the reverse brake 32 are each disengaged.

The variator 4 has a primary pulley 42, a secondary pulley 43 and a pulley belt 44. The variator 4 has a continuously variable transmission function that continuously varies a transmission ratio (a ratio between a variator input rotation speed and a variator output rotation speed) by change of a belt contact diameter. The primary pulley 42 is configured by a fixed pulley 42a and a slide pulley 42b that are coaxially aligned with a variator input shaft 40. The slide pulley 42b moves (slides) by a primary pressure Ppri that is supplied in a primary pressure chamber 45. The secondary pulley 43 is configured by a fixed pulley 43a and a slide pulley 43b that are coaxially aligned with a variator output shaft 41. The slide pulley 43b moves (slides) by a secondary pressure Psec that is supplied in a secondary pressure chamber 46. The pulley belt 44 is wound around a V-shaped sheave surface of the primary pulley 42 and a V-shaped sheave surface of the secondary pulley 43. The pulley belt 44 is configured by two multilayer rings each formed by layering or stacking a plurality of annular rings from an inside toward an outside and a plurality of elements each formed by a stamped plate member and fixed to the two multilayered rings with the plurality of elements sandwiched between the two multilayered rings and annularly stacked along the two multilayered rings. However, as the pulley belt 44, a chain-type belt formed by connecting a plurality of chain elements, which are arranged in a pulley travelling direction, with pins which penetrate the chain elements in a pulley axis direction could be used.

The final speed reduction mechanism 5 is a mechanism that reduces a variator output rotation speed from the variator output shaft 41 and transmits it to the right and left driving wheels 6, 6 with a differential function provided. This final speed reduction mechanism 5 has, as a reduction gear mechanism, an output gear 52 provided at the variator output shaft 41, an idler gear 53 and a reduction gear 54 each provided at an idler shaft 50 and a final gear 55 provided at an outer peripheral position of a differential case. The final speed reduction mechanism 5 also has, as a differential gear mechanism, a differential gear 56 that are interposed between right and left drive shafts 51, 51.

As shown in FIG. 1, the control system of the engine vehicle has a hydraulic control unit 7 that is representative of a hydraulic control system and a CVT control unit 8 that is representative of an electronic control system.

The hydraulic control unit 7 is a unit that regulates the primary pressure Ppri led to the primary pressure chamber 45, the secondary pressure Psec led to the secondary pressure chamber 46, the forward clutch pressure Pfc for the forward clutch 31 and the reverse brake pressure Prb for the reverse brake 32 etc. The hydraulic control unit 7 has an oil pump 70 that is driven and rotates by the engine 1 as a travelling driving source and a hydraulic control circuit 71 that regulates each control pressure on the basis of a discharge pressure from the oil pump 70. The hydraulic control circuit 71 has a line pressure solenoid valve 72, a primary pressure solenoid valve 73, a secondary pressure solenoid valve 74, a selection solenoid valve 75 and a lock-up pressure solenoid valve 76. The solenoid valves 72, 73, 74, 75 and 76 regulate hydraulic pressure to their respective command pressures by respective control command values outputted from the CVT control unit 8.

The line pressure solenoid valve 72 regulates the discharge pressure from the oil pump 70 to a commanded line pressure PL according to a line pressure command value outputted from the CVT control unit 8. This line pressure PL is a source pressure when regulating each control pressure, and serves as hydraulic pressure for suppressing belt-slip and clutch-slip against torque transmitted through the driveline.

The primary pressure solenoid valve 73 regulates and reduces the line pressure PL as the source pressure to a commanded primary pressure Ppri according to a primary pressure command value outputted from the CVT control unit 8. The secondary pressure solenoid valve 74 regulates and reduces the line pressure PL as the source pressure to a commanded secondary pressure Psec according to a secondary pressure command value outputted from the CVT control unit 8.

The selection solenoid valve 75 regulates and reduces the line pressure PL as the source pressure to a commanded forward clutch pressure Pfc or a commanded reverse brake pressure Prb according to a forward clutch pressure command value or a reverse brake pressure command value outputted from the CVT control unit 8.

The lock-up pressure solenoid valve 76 adjusts a lock-up control pressure PL/U for engaging/slip-engaging/disengaging the lock-up clutch 20 according to a lock-up pressure command value outputted from the CVT control unit 8.

The CVT control unit 8 performs a line pressure control, a shift control, a forward-reverse switching control and a lock-up control etc. Regarding the line pressure control, the CVT control unit 8 outputs a command value to obtain a target line pressure according to a throttle opening etc. to the line pressure solenoid valve 72. Regarding the shift control, when a target transmission ration (a target primary rotation speed Npri*) is determined, the CVT control unit 8 outputs command values to obtain the determined target transmission ration (the determined target primary rotation speed Npri*) to the primary pressure solenoid valve 73 and the secondary pressure solenoid valve 74. Regarding the forward-reverse switching control, the CVT control unit 8 outputs a command value for controlling engagement/disengagement of the forward clutch 31 and the reverse brake 32 according to a selected range position to the selection solenoid valve 75. Regarding the lock-up control, the CVT control unit 8 outputs a command value for controlling the lock-up control pressure PL/U for engaging/slip-engaging/ disengaging the lock-up clutch 20 to the lock-up pressure solenoid valve 76.

The CVT control unit 8 inputs sensor information and switch information from a primary rotation speed sensor 80, a vehicle speed sensor 81, a secondary pressure sensor 82, an oil temperature sensor 83, an inhibitor switch 84, a brake switch 85, an accelerator opening sensor 86, a primary pressure sensor 87 and a turbine rotation speed sensor 89 etc. Further, an engine control unit 88 inputs sensor information from an engine rotation speed sensor 12. For instance, the CVT control unit 8 inputs engine torque information from the engine control unit 88, and outputs an engine torque request to the engine control unit 88.

Figure 2:
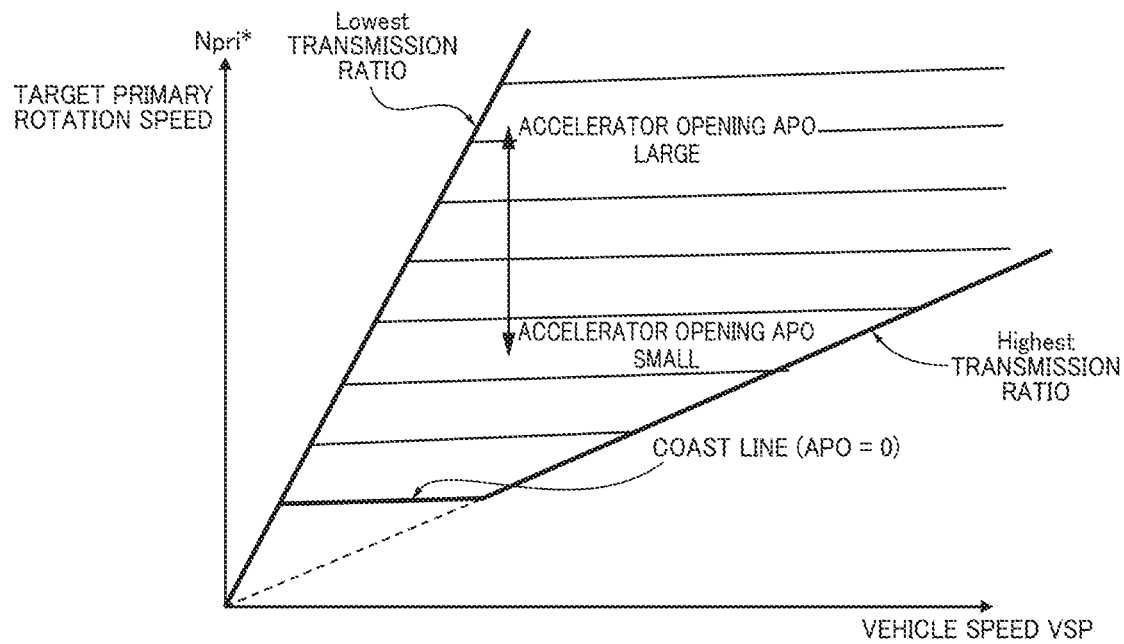
FIG. 2 is a shift schedule drawing showing an example of a D-range continuously variable shift schedule used when performing a continuously variable shifting control in an automatic shift mode by a variator.

FIG. 2 shows an example of a D-range continuously variable shift schedule used when performing a continuously variable shifting control in an automatic shift mode by the variator 4.

"D-range shift mode" is an automatic shift mode in which the transmission ratio is automatically continuously varied according to a vehicle operating condition. The shift control in the D-range shift mode is performed by determining the target primary rotation speed Npri* by an operating point (VSP, APO) determined by a vehicle speed VSP (the vehicle speed sensor 81) and an accelerator opening APO (the accelerator opening sensor 86) on the D-range continuously variable shift schedule of FIG. 2.

That is, the D-range continuously variable shift schedule used in the D-range shift mode is set such that, as shown in FIG. 2, the transmission ratio is continuously varied within a transmission ratio range defined by a Lowest transmission ratio and a Highest transmission ratio according to the operating point (VSP, APO). For instance, when the vehicle speed VSP is constant, if an accelerator pedal depressing operation is performed, the target primary rotation speed Npri* is increased, and shift is done to a down-shift direction, while if an accelerator pedal returning operation is performed, the target primary rotation speed Npri* is decreased, and shift is done to an up-shift direction. When the accelerator opening APO is constant, if the vehicle speed VSP increases, shift is done to the up-shift direction, while if the vehicle speed VSP decreases, shift is done to the down-shift direction.

[Selection Solenoid Valve Abnormality Diagnosing Device Configuration]

Figure 3:
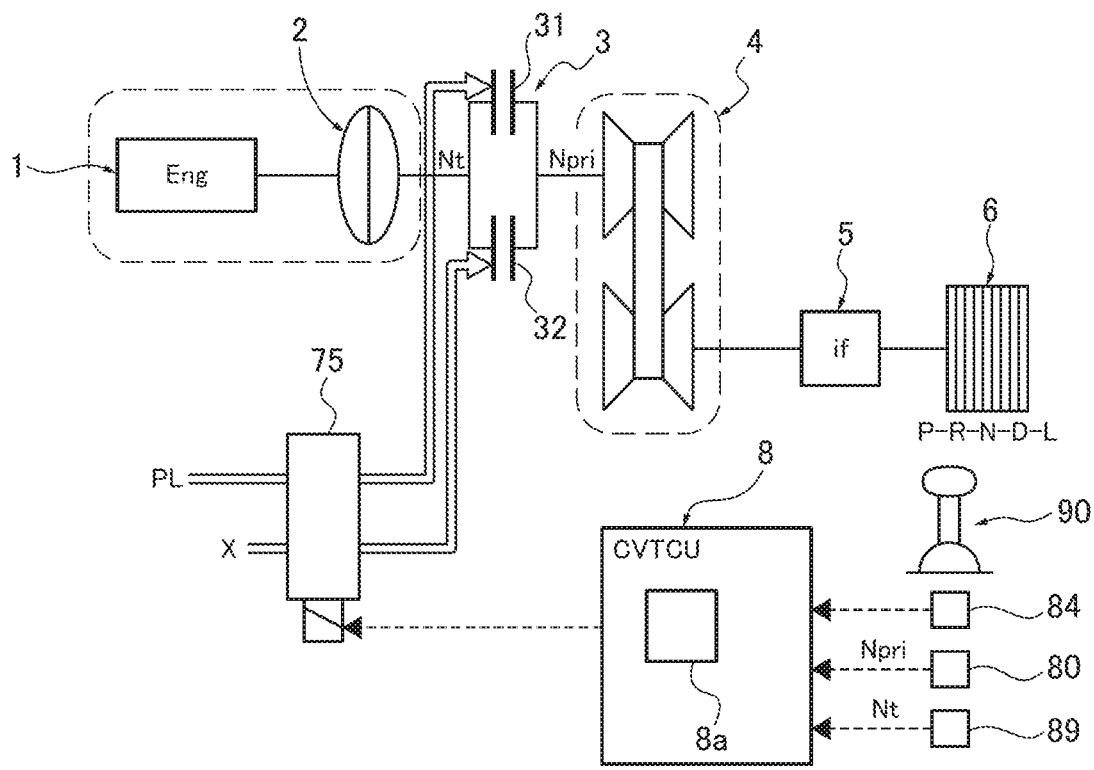
FIG. 3 is a configuration of a main part, showing the selection solenoid valve abnormality diagnosing device according to the embodiment.

FIG. 3 shows the selection solenoid valve abnormality diagnosing device according to the embodiment. In the following description, a configuration of the selection solenoid valve abnormality diagnosing device will be explained with reference to FIG. 3.

As shown in FIG. 3, the selection solenoid valve abnormality diagnosing device has the forward clutch 31 (a travel clutch), the reverse brake 32 (a travel clutch), the selection solenoid valve 75 and a selection solenoid valve abnormality diagnosing unit 8*a*. The selection solenoid valve abnormality diagnosing device also has, as main sensors and switches for providing input information to the selection solenoid valve abnormality diagnosing unit 8*a*, the primary rotation speed sensor 80, the inhibitor switch 84, the turbine rotation speed sensor 89 and a selector lever 90.

The forward clutch 31 and the reverse brake 32 are arranged parallel to each other in the forward-reverse switching mechanism 3 provided between the torque convertor 2 and the variator 4. The forward clutch 31 is engaged when selecting the forward drive range (D-range, L-range) by the selector lever 90, and is disengaged when selecting the other range (P-range, R-range, N-range). The reverse brake 32 is engaged when selecting the reverse drive range (R-range) by the selector lever 90, and is disengaged when selecting the other range (P-range, N-range, D-range, L-range).

The selection solenoid valve 75 controls engagement/disengagement of the forward clutch 31 and the reverse brake 32 in synchronization with a selecting operation of the selector lever 90 selecting the range position of the belt-type continuously variable transmission CVT. In the embodiment, since there is no case where both of the forward clutch 31 and the reverse brake 32 are engaged at the same time, one selection solenoid valve 75 having a three-direction linear solenoid valve structure is used, then engagement/disengagement of the two travel clutches is controlled by the one selection solenoid valve 75.

The selection solenoid valve abnormality diagnosing unit 8a is provided in the CVT control unit 8. A basic idea of the abnormality diagnosis is the following. When performing the selecting operation from a no-drive range to the drive range, if a time required for the travel clutch to be judged to be engaged from a start of selection of the drive range is less than a predetermined time, the selection solenoid valve 75 is judged to be a maximum hydraulic pressure side abnormality.

Here, in the embodiment, an engagement judgment of the travel clutch is made by detecting decrease in a travel clutch input rotation speed (=the turbine rotation speed Nt) due to increase in a load resistance when the travel clutch is engaged. That is, when performing the selecting operation from the no-drive range to the drive range, if a selection lag time required for the turbine rotation speed Nt to become a threshold value or less from the start of selection of the drive range is less than a predetermined time, the selection solenoid valve 75 is judged to be the maximum hydraulic pressure side abnormality (a continuously-MAX pressure-outputting failure). Then, when performing the selecting operation from the no-drive range to the drive range, if the selection lag time required for the turbine rotation speed Nt to become the threshold value or less from the start of selection of the drive range is equal to or greater than the predetermined time, the selection solenoid valve 75 is judged to be normal. It is noted that the no-drive range indicates N-range and P-range, and the drive range indicates D-range, R-range and L-range.

The primary rotation speed sensor 80 is a sensor that detects a primary rotation speed Npri that is a rotation speed of the variator input shaft 40 connected to the primary pulley 42 by the number of pulse counts that is the number of count times of a pulse wave signal. This primary rotation speed Npri corresponds to a travel clutch output rotation speed.

The inhibitor switch 84 detects the range position (P-range, R-range, N-range, D-range and L-range) selected by the selector lever 90, and outputs a range position signal corresponding to the range position. The selecting operation by a driver is detected by detecting or checking the range position signal outputted from the inhibitor switch 84.

The turbine rotation speed sensor 89 is a sensor that detects the turbine rotation speed Nt that is a rotation speed of the torque convertor output shaft 21 connected to the turbine runner 24 of the torque convertor 2 by the number of pulse counts that is the number of count times of a pulse wave signal. This turbine rotation speed Nt corresponds to the travel clutch input rotation speed.

[Selection Solenoid Valve Abnormality Diagnosing Process]

Figure 4:
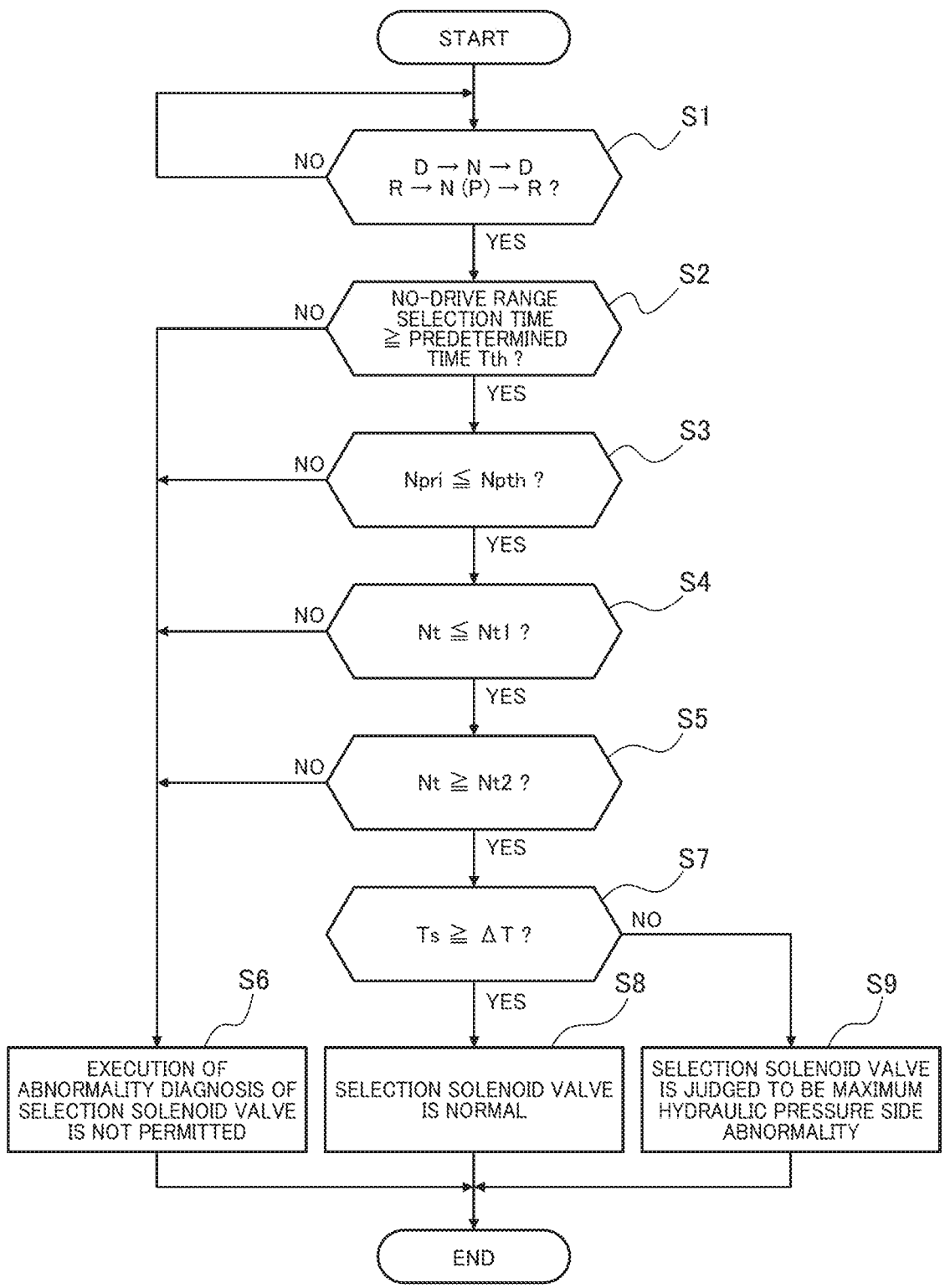
FIG. 4 is a flowchart showing a flow of a selection solenoid valve abnormality diagnosing process executed by a selection solenoid valve abnormality diagnosing unit in a CVT control unit, according to the embodiment.

FIG. 4 shows a flow of a selection solenoid valve abnormality diagnosing process executed by the selection solenoid valve abnormality diagnosing unit 8a in the CVT control unit 8, according to the embodiment. In the following description, each step of FIG. 4, showing the selection solenoid valve abnormality diagnosing process, will be explained. This flow chart starts during vehicle stop where the vehicle speed VSP is equal to or less than a stop judgment threshold value.

At step S1, a judgment is made as to whether or not the selecting operation of D-range→N-range→D-range or R-range→N-range (P-range)→R-range is performed. If YES (a range-change selecting operation occurs), the routine proceeds to step S2. If NO (the range-change selecting operation does not occur), the judgment of step S1 is repeated.

At step S2, subsequent to the judgement of "the range-change selecting operation occurs" at step S1, a judgment is made as to whether or not a no-drive range selection time is equal to or greater (longer) than a setting time Tth. If YES (the no-drive range selection time≥the setting time Tth), the routine proceeds to step S3. If NO (the no-drive range selection time<the setting time Tth), the routine proceeds to step 66.

Here, the no-drive range selection time is a no-drive range (N-range, P-range) selection holding time required for the switching from a switching start timing from the drive range to the no-drive range to a switching start timing from the no-drive range to the drive range.

The setting time Tth is set to a time (e.g. about 0.8 sec) required for working fluid to be completely drained from an oil chamber of the engaged travel clutch by the selecting operation of D-range (R-range)→N-range (P-range). For instance, a time required for the working fluid to be completely drained from a clutch oil chamber of the forward clutch 31 at N-range is measured upon the selecting operation of D-range→N-range by experiment. Also, a time required for the working fluid to be completely drained from a brake oil chamber of the reverse brake 32 at N-range is measured upon the selecting operation of R-range→N-range (P-range) by experiment. Then, as the setting time Tth, a time required for the working fluid to be surely and completely drained from the clutch oil chamber and the brake oil chamber is determined by a plurality of experimental values.

At step S3, subsequent to the judgement of "the no-drive range selection time≥the setting time Tth" at step S2, a judgment is made as to whether or not the primary rotation speed Npri at the start of selection of the drive range is equal to or less than a threshold value Npth. If YES (the primary rotation speed Npri≤the threshold value Npth), the routine proceeds to step S4. If NO (the primary rotation speed Npri>the threshold value Npth), the routine proceeds to step S6.

Here, when diagnosing abnormality of the selection solenoid valve 75, the threshold value Npth is set to the same value (e.g. about 200 rpm) as a threshold value (a threshold value Ntth) to which the turbine rotation speed Nt is decreased.

At step S4, subsequent to the judgement of "the primary rotation speed Npri≤the threshold value Npth" at step S3, a judgment is made as to whether or not the turbine rotation speed Nt is equal to or less than a first setting value Nt1. If YES (the turbine rotation speed Nt≤the first setting value Nt1), the routine proceeds to step S5. If NO (the turbine rotation speed Nt>the first setting value Nt1), the routine proceeds to step S6.

Here, as described later, the first setting value Nt1 is set to a lower limit threshold value (e.g. about 800 rpm) of a region where there is a strong possibility that "normal" will be misjudged even in a case of "abnormal".

At step S5, subsequent to the judgement of "the turbine rotation speed Nt≤the first setting value Nt1" at step S4, a judgment is made as to whether or not the turbine rotation speed Nt is equal to or greater than a second setting value Nt2 that is lower than the first setting value Nt1. If YES (the turbine rotation speed Nt≥the second setting value Nt2), the routine proceeds to step S7. If NO (the turbine rotation speed Nt<the second setting value Nt2), the routine proceeds to step S6.

Here, the second setting value Nt2 is a value that is lower than the first setting value Nt1. And, as described later, the second setting value Nt2 is set to an upper limit threshold value (e.g. about 600 rpm) of a region where there is a strong possibility that "abnormal" will be misjudged even in a case of "normal".

At step S6, when NO judgment is made at any one of steps S2, S3, S4 and S5, the abnormality diagnosis of the selection solenoid valve 75, which is executed at step S7, is not permitted, and the routine proceeds to END.

That is, conditions under which execution of the abnormality diagnosis of the selection solenoid valve 75 is not permitted are the following.
(a) A selecting operation speed condition of "the no-drive range selection time<the setting time Tth" at step S2 is satisfied.
(b) A clutch output rotation speed condition of "the primary rotation speed Npri>the threshold value Npth" at step S3 is satisfied.
(c) A first clutch input rotation speed condition of "the turbine rotation speed Nt>the first setting value Nt1" at step S4 is satisfied.
(d) A second clutch input rotation speed condition of "the turbine rotation speed Nt<the second setting value Nt2" at step S5 is satisfied.

At step S7, subsequent to the judgement of "the turbine rotation speed Nt≥the second setting value Nt2" at step S5, a judgment is made as to whether or not, when performing the selecting operation from the no-drive range to the drive range, a selection lag time Ts required for the turbine rotation speed Nt to become the threshold value Ntth or less from the start of selection of the drive range is equal to or greater than a predetermined time ΔT. If YES (the selection lag time Ts≥the predetermined time ΔT), the routine proceeds to step S8. If NO (the selection lag time Ts<the predetermined time ΔT), the routine proceeds to step S9.

Here, the predetermined time ΔT is set to e.g. about 0.4 sec upon the selecting operation of N-range→D-range. Also, the predetermined time ΔT is set to e.g. about 0.3 sec upon the selecting operation of N-range (P-range)→R-range.

At step S8, subsequent to the judgement of "the selection lag time Ts≥the predetermined time ΔT" at step S7, the selection solenoid valve 75 is judged to be normal, and the routine proceeds to END.

At step 39, subsequent to the judgement of "the selection lag time Ts<the predetermined time ΔT" at step S7, the selection solenoid valve 75 is judged to be the maximum hydraulic pressure side abnormality (the continuously-MAX pressure-outputting failure), and the routine proceeds to END.

Next, operation will be explained.
Operation of the embodiment will be separately explained below by [Abnormality diagnosis of selection solenoid valve], [No permission of execution of abnormality diagnosis by selecting operation speed condition] and [No permission of execution of abnormality diagnosis by clutch input and output rotation speed conditions].

Figure 5:
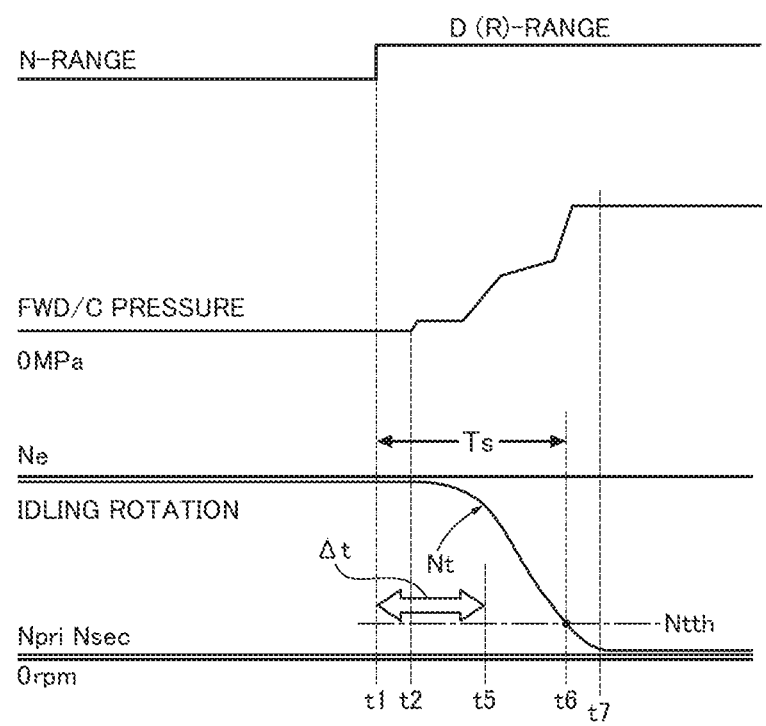
FIG. 5 shows time charts of characteristics of a range position, a forward clutch pressure, an engine rotation speed Ne, a turbine rotation speed Nt, a primary rotation speed Npri and a secondary rotation speed Nsec when a selection solenoid valve is judged to be normal upon an N→D selecting operation during vehicle stop.
Figure 6:
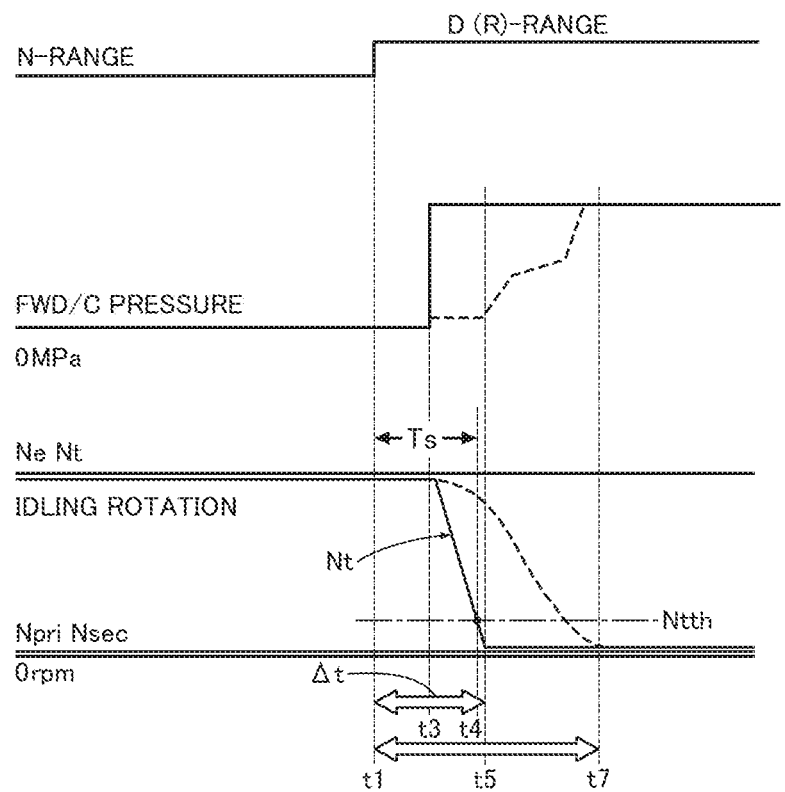
FIG. 6 shows time charts of characteristics of the range position, the forward clutch pressure, the engine rotation speed Ne, the turbine rotation speed Nt, the primary rotation speed Npri and the secondary rotation speed Nsec when the selection solenoid valve is judged to be abnormal upon the N→D selecting operation during vehicle stop.

[Abnormality Diagnosis of Selection Solenoid Valve]
FIG. 5 shows time charts of characteristics when the selection solenoid valve 75 is judged to be normal upon an N→D selecting operation during vehicle stop. FIG. 6 shows time charts of characteristics when the selection solenoid valve 75 is judged to be abnormal upon the N→D selecting operation during vehicle stop. In the following description, the abnormality diagnosis of selection solenoid valve 75 will be explained with reference to FIGS. 4 to 6.

During vehicle stop, after the selecting operation of D-range→N-range or R-range→N-range (P-range), the selecting operation of N-range→D-range or N-range (P-range)→R-range is performed. At this time, when the selecting operation speed condition that permits execution of the abnormality diagnosis of the selection solenoid valve 75 is satisfied and also the clutch input and output rotation speed conditions that permit execution of the abnormality diagnosis of the selection solenoid valve 75 are all satisfied, in the flow chart in FIG. 4, the routine proceeds in an order of step S1→step S2→step S3→step S4→step S5→step S7. At step S7, a judgment is made as to whether or not, when performing the selecting operation from the no-drive range to the drive range, the selection lag time Ts required for the turbine rotation speed Nt to become the threshold value Ntth or less from the start of selection of the drive range is equal to or greater than the predetermined time ΔT.

Then, when "the selection lag time Ts≥the predetermined time ΔT" is judged at step S7, the routine proceeds to step S8 from step S7, and the selection solenoid valve 75 is judged to be normal at step S8. On the other hand, when "the selection lag time Ts<the predetermined time ΔT" is judged at step S7, the routine proceeds to step S9 from step S7, and the selection solenoid valve 75 is judged to be the maximum hydraulic pressure side abnormality (the continuously-MAX pressure-outputting failure) at step S9.

An operation of a normal judgment by which the above abnormality diagnosing process of the selection solenoid valve 75 is performed upon the N→D selecting operation during vehicle stop and the selection solenoid valve 75 is judged to be normal will be explained with reference to FIG. 5. Here, as an example of the predetermined time ΔT used for the abnormality diagnosis, it is a time required for the travel clutch to be fully engaged from the selecting operation of the drive range when the selection solenoid valve 75 is in the continuously-MAX pressure-outputting failure.

When the N→D selecting operation is performed at time t1, at time t2 that is a time at which a preparing time for supplying the working fluid in an oil passage elapses, a forward clutch pressure (FWD/C pressure) of the forward clutch 31 starts to increase. When the forward clutch 31 starts having an engagement capacity, this engagement capacity of the forward clutch 31 becomes a load resistance for the turbine runner 24 of the torque convertor 2, and the turbine rotation speed Nt starts to decrease from time t2. The predetermined time ΔT from the start time t1 of selection of D-range elapses at time t5, and the selection lag time Ts required for the turbine rotation speed Nt to become the threshold value Ntth or less from the start time t1 of selection of D-range elapses at time t6. Then, at time t7, the forward clutch 31 is fully engaged (Nt=Npri). Therefore, by judgment of the selection lag time Ts (t1~t6)≥the predetermined time ΔT (t1~t5) by the selection solenoid valve abnormality diagnosis, the selection solenoid valve 75 is judged not to be the continuously-MAX pressure-outputting failure.

An operation of an abnormality judgment by which the above abnormality diagnosing process of the selection solenoid valve 75 is performed upon the N→D selecting operation during vehicle stop and the selection solenoid valve 75 is judged to be abnormal will be explained with reference to FIG. 6.

When the N→D selecting operation is performed at time t1, the line pressure is directly supplied to the forward clutch 31 due to an anomaly of sticking or adhesion (or fixation) of the selection solenoid valve 75 at a spool fully-open range, and the forward clutch pressure abruptly increases. Therefore, an abruptly-increased engagement capacity of the forward clutch 31 becomes a load resistance for the turbine runner 24 of the torque convertor 2, and the turbine rotation speed Nt decreases at a steep gradient immediately after time t3. Because of this, at time t4 that is a time before the predetermined time ΔT from the start time t1 of selection of D-range elapses, the turbine rotation speed Nt becomes the threshold value Ntth or less. That is, a time from the start time t1 of selection of D-range to time t4 is the selection lag time Ts. Then, at time t5, the forward clutch 31 is fully engaged (Nt=Npri). Therefore, by judgment of the selection lag time Ts (t1~t4)<the predetermined time ΔT (t1~t5) by the selection solenoid valve abnormality diagnosis, the selection solenoid valve 75 is judged to be abnormal.

In this manner, upon the selecting operation from the no-drive range to the drive range during vehicle stop, when all the conditions that permit execution of the abnormality diagnosis of the selection solenoid valve 75 are satisfied, the abnormality diagnosis of the selection solenoid valve 75 by judgment of the selection lag time Ts is accurately carried out. That is, when the selection solenoid valve 75 is in a normal state, the selection solenoid valve 75 is correctly judged to be normal, and when the maximum hydraulic pressure side abnormality (the continuously-MAX pressure-outputting failure) occurs at the selection solenoid valve 75, the selection solenoid valve 75 is correctly judged to be abnormal.

[No Permission of Execution of Abnormality Diagnosis by Selecting Operation Speed Condition]

Figure 7:
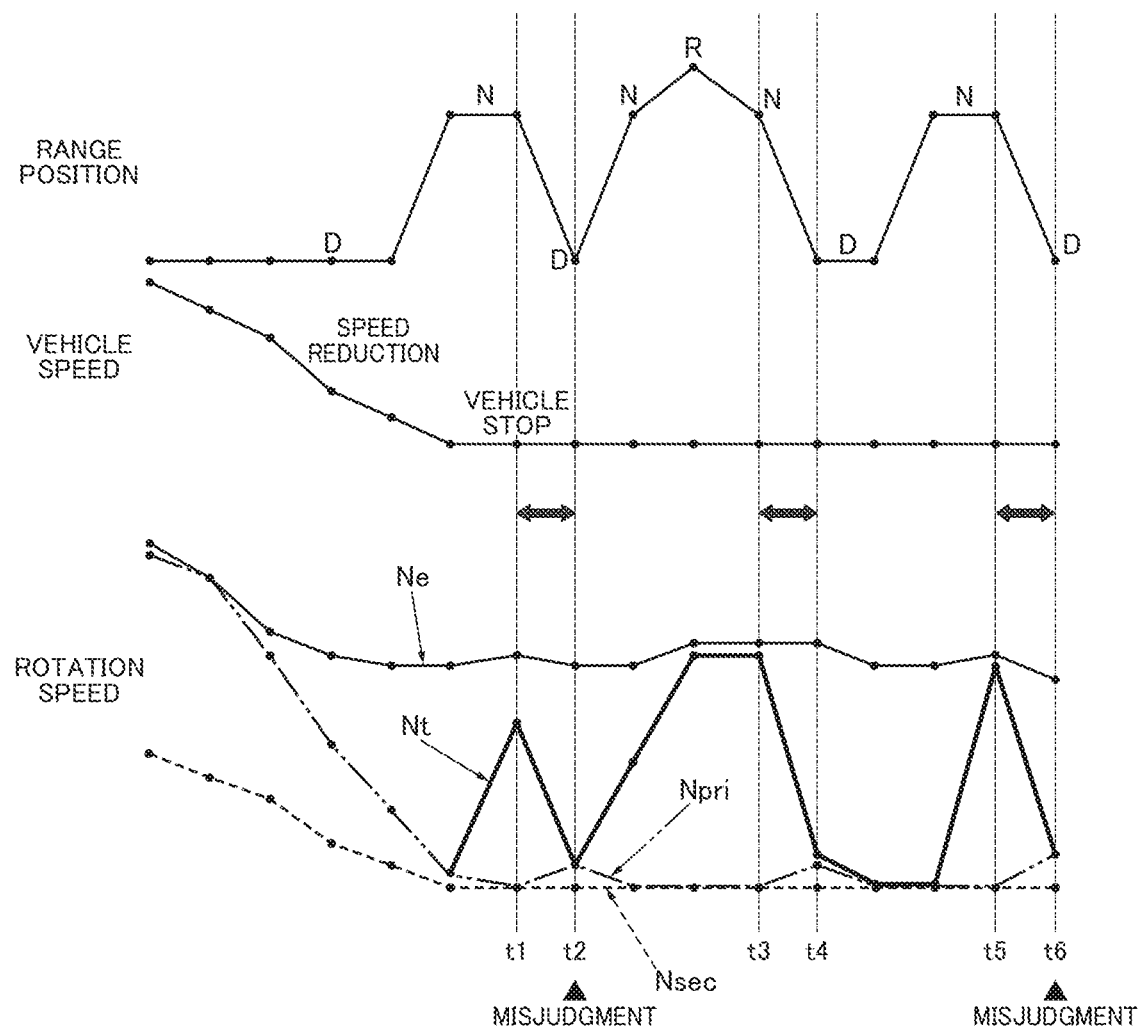
FIG. 7 is a comparative example, showing time charts of characteristics of the range position, a vehicle speed, the engine rotation speed, the turbine rotation speed, the primary rotation speed and the secondary rotation speed in an example of a misjudgment-occurring scene in which the selection solenoid valve is wrongly judged to be a maximum hydraulic pressure side abnormality.
Figure 8:
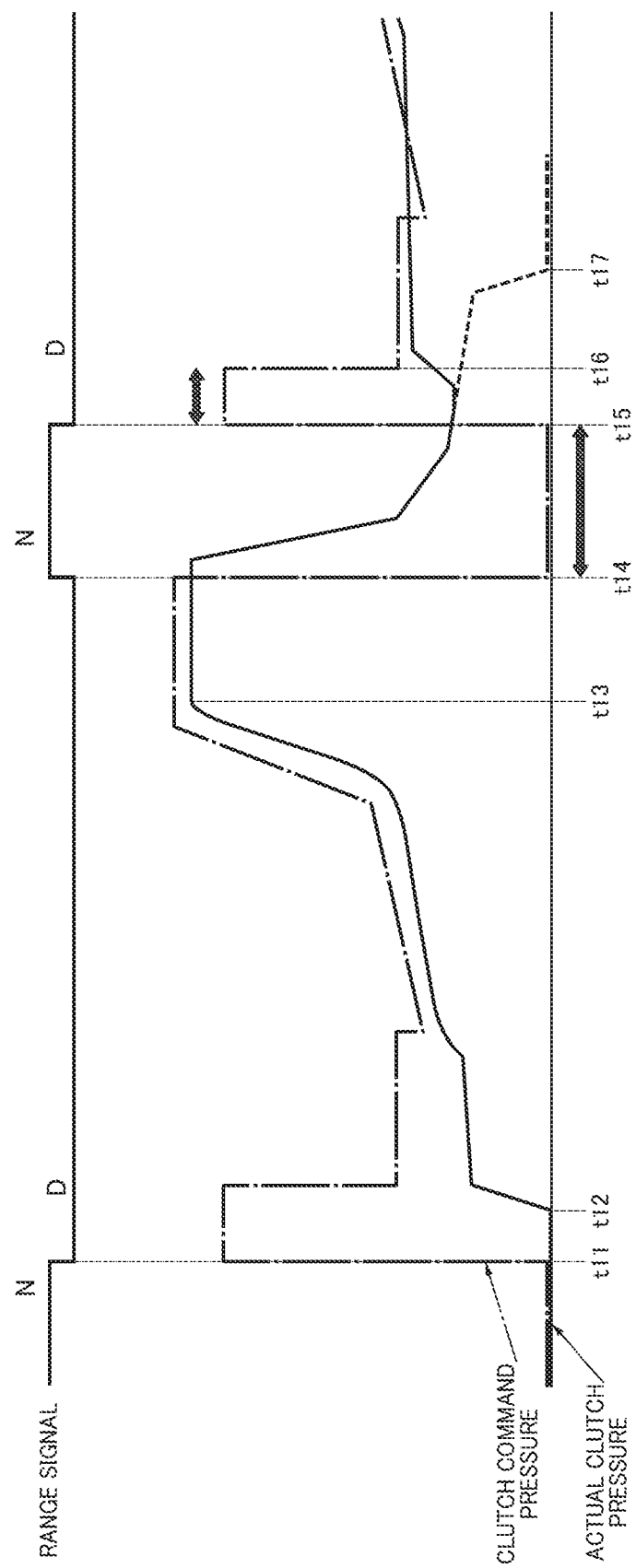
FIG. 8 is an explanatory drawing showing a selecting operation speed condition for no-permission/permission of execution of an abnormality diagnosis of the selection solenoid valve.

FIG. 7 is a comparative example, showing time charts of characteristics in an example of a misjudgment-occurring scene in which the selection solenoid valve is wrongly judged to be the maximum hydraulic pressure side abnormality. FIG. 8 shows the selecting operation speed condition for no-permission/permission of execution of the abnormality diagnosis of the selection solenoid valve 75. In the following description, no permission of execution of the abnormality diagnosis by the selecting operation speed condition will be explained with reference to FIGS. 4, 7 and 8.

The comparative example is an example in which when the range-change selecting operation is done continuously in a short time, execution of the abnormality diagnosis of the selection solenoid valve 75 is permitted. The misjudgment-occurring scene in which the selection solenoid valve is wrongly judged to be the maximum hydraulic pressure side abnormality in this comparative example will be explained with reference to FIG. 7.

In the scene, the vehicle decelerates and stops, and as shown in FIG. 7, the continuous selecting operation of D-range→N-range→D-range→N-range→R-range→N-range→D-range→N-range→D-range is done in a short time during vehicle stop. At this time, the selection solenoid valve 75 which is in a normal state is wrongly judged to be the maximum hydraulic pressure side abnormality.

The reason of this misjudgment is because as an abnormality judging method of the selection solenoid valve, an abnormality judging method by which when the selection lag time Ts required for the turbine rotation speed Nt to become the threshold value Ntth or less from the start of selection of the drive range is less than the predetermined time ΔT, the selection solenoid valve is judged to be abnormal is employed. That is, when the selection lag time Ts is less than the predetermined time ΔT, the selection solenoid valve is judged to be abnormal without taking the selecting operation speed into consideration.

Therefore, in a case of the continuous selecting operation scene as shown in FIG. 7, by the selecting operation from time t1 to time t2, the selection lag time Ts becomes less than the predetermined time ΔT, and also by the selecting operation from time t5 to time t6, the selection lag time Ts becomes less than the predetermined time ΔT. As a result, at time t2 and time t6, the selection solenoid valve 75 which is in a normal state is wrongly judged to be the maximum hydraulic pressure side abnormality. However, in a case of the selecting operation from time t3 to time t4, since the drive range before changing to the no-drive range (N-range) is R-range and the drive range after changing from the no-drive range (N-range) is D-range then a different travel clutch (the reverse brake 32, the forward clutch 31) is engaged at each change, the misjudgment does not occur.

The reason why when performing the continuous selecting operation, the selection lag time Ts becomes short is because before oil is completely drained from an oil chamber of a travel clutch pressure, the drive range in which the oil is supplied to the same oil chamber is selected again.

That is, in FIG. 8, when the range is changed from N-range to D-range at time t11, the selection solenoid valve inputs a clutch command pressure shown by a dashed line in FIG. 8, and an actual clutch pressure starts to rise at time t12. Further, at time t13, the actual clutch pressure increases to a clutch full engagement level. After that, when the range is changed from D-range to N-range at time t14, although the clutch command pressure decreases to zero pressure at once, the actual clutch pressure starts to decrease at a predetermined gradient with a delay from the clutch command pressure. Then, at time t15, when the range is changed from N-range to D-range again before the actual clutch pressure decreases to zero pressure, i.e. before oil is completely drained from the oil chamber of the forward clutch pressure, the selection solenoid valve inputs an initial command that brings the clutch command pressure to a maximum from time t15 to time t16. Because of this, as compared with rise-up of the actual clutch pressure for the forward clutch from zero pressure shown at and after time t11, the actual clutch pressure rises in a good response. In other words, it was found that when performing the selecting operation of D-range→N-range→D-range, if the operation does not wait until the actual clutch pressure becomes zero pressure with the selection time of N-range being at least time (a period of time) t14 to t17, an accurate judgment of the maximum hydraulic pressure side abnormality of the selection solenoid valve is impossible.

The inventor focuses attention on this point, and in the embodiment, when performing the selecting operation of the drive range→the no-drive range→the drive range, if the selecting operation speed condition indicating that the no-drive range selection time is shorter than the setting time Tth is satisfied, execution of the abnormality diagnosis of the selection solenoid valve 75 is not permitted.

That is, in the case where, during vehicle stop, the range-change selecting operation of D-range→N-range→D-range or R-range→N-range (P-range)→R-range is done continuously in a short time, if "the no-drive range selection time<the setting time Tth" is judged at step S2 in FIG. 4, the routine proceeds in an order of step S1→step S2→step S6→END. At step S6, the abnormality diagnosis of the selection solenoid valve 75, which is executed at step S7, is not permitted.

That is, as shown in FIG. 8, if the selection time of N-range is time (a period of time) t14 to t15, "the N-range selection time<the setting time Tth" is judged, then the abnormality diagnosis of the selection solenoid valve 75 is not permitted. As a consequence, when the selecting operation by which the selector lever crosses the no-drive range (N-range, P-range) is performed in a short time, the misjudgment of the maximum hydraulic pressure side abnormality of the selection solenoid valve 75 is prevented.

[No Permission of Execution of Abnormality Diagnosis by Clutch Input and Output Rotation Speed Conditions]

Figure 9:
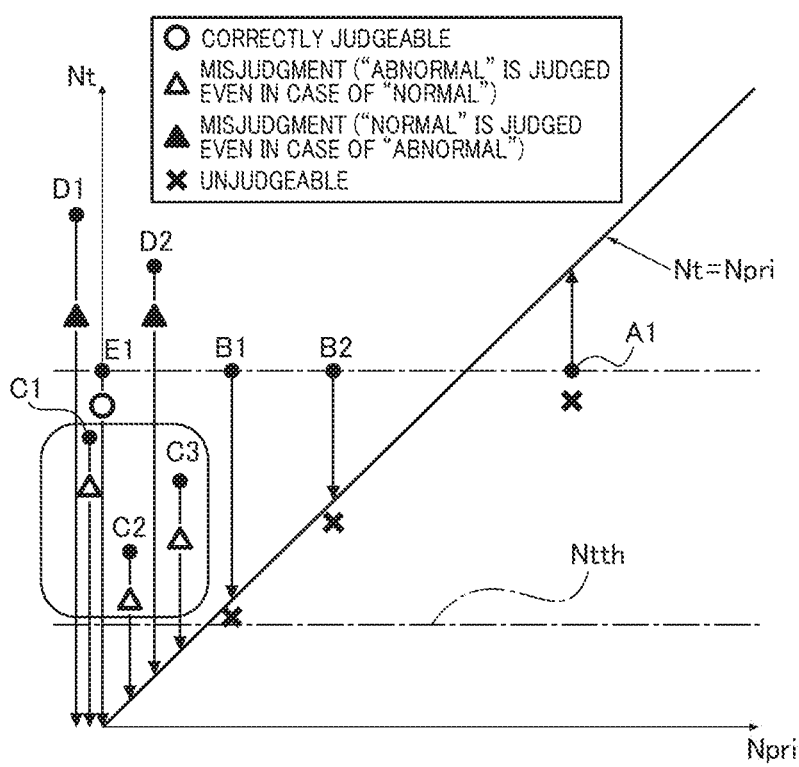
FIG. 9 is an explanatory drawing showing changes of the turbine rotation speed when executing the abnormality diagnosis of the selection solenoid valve with a clutch operating point changed.
Figure 10:
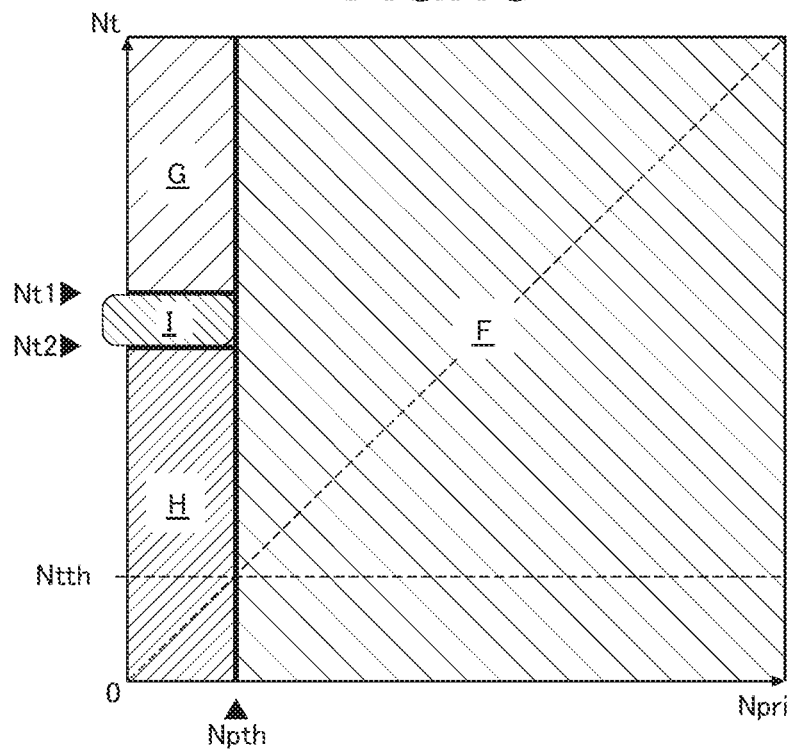
FIG. 10 is an explanatory drawing showing clutch input and output rotation speed conditions for no-permission/ permission of execution of the abnormality diagnosis of the selection solenoid valve.

FIG. 9 shows changes of the turbine rotation speed when executing the abnormality diagnosis of the selection solenoid valve 75 with a clutch operating point changed. FIG. 10 shows the clutch input and output rotation speed conditions for no-permission/permission of execution of the abnormality diagnosis of the selection solenoid valve. In the following description, no permission of execution of the abnormality diagnosis by the clutch input and output rotation speed conditions will be explained with reference to FIGS. 4, 9 and 10.

First, as the abnormality judging method, when the selection lag time Ts required for the turbine rotation speed Nt to become the threshold value Ntth or less from the start of selection of the drive range is less than the predetermined time ΔT, the selection solenoid valve is judged to be abnormal. Thus, when the travel clutch is engaged by the selecting operation of the drive range, the clutch input rotation speed becomes equal to the clutch output rotation speed (the turbine rotation speed Nt becomes equal to the primary rotation speed Npri). Therefore, when the travel clutch is engaged by the selecting operation of the drive range and the turbine rotation speed Nt decreases, the turbine rotation speed Nt and the primary rotation speed Npri finally converge to "Nt=Npri".

Thus, as shown in FIG. 9, the clutch input and output rotation speed conditions of the abnormality diagnosis conditions of the selection solenoid valve 75 are considered as a coordinate plane whose horizontal axis is the primary rotation speed Npri (=the clutch output rotation speed) and whose vertical axis is the turbine rotation speed Nt (=the clutch input rotation speed).

On the coordinate plane, if the clutch operating point (Nt, Npri) at the start of selection of the drive range is a clutch operating point A1, the turbine rotation speed Nt increases by the engagement of the travel clutch. If the clutch operating point (Nt, Npri) is a clutch operating point B1 or B2, although the turbine rotation speed Nt decreases by the engagement of the travel clutch, the turbine rotation speed Nt cannot decrease to the threshold value Ntth.

If the clutch operating point (Nt, Npri) is a clutch operating point C1, C2 or C3, although the turbine rotation speed Nt decreases by the engagement of the travel clutch, since the turbine rotation speed Nt is close to the threshold value Ntth then the selection lag time Ts becomes short, there is a strong possibility that "abnormal" will be misjudged even in a case of "normal".

If the clutch operating point (Nt, Npri) is a clutch operating point D1 or D2, although the turbine rotation speed Nt decreases by the engagement of the travel clutch, since the turbine rotation speed Nt is positioned away from the threshold value Ntth then the selection lag time Ts becomes long, there is a strong possibility that "normal" will be misjudged even in a case of "abnormal".

However, if the clutch operating point (Nt, Npri) is a clutch operating point E1, when the turbine rotation speed Nt decreases by the engagement of the travel clutch, there is a strong possibility that an accurate judgment will be made.

Therefore, the clutch operating point (Nt, Npri) is replaced with a region, and redrawn as a region section on an Npri/Nt coordinate plane. Then, as shown in FIG. 10, the region section is divided into a region F where the abnormality judgment is impossible, a region G where there is a strong possibility that "normal" will be misjudged even in a case of "abnormal", a region H where there is a strong possibility that "abnormal" will be misjudged even in a case of "normal" and a region I where a correct judgment is possible. In the embodiment, by the region section shown in FIG. 10, the clutch input and output rotation speed conditions that do not permit execution of the abnormality diagnosis are determined.

In the embodiment, when performing the selecting operation from the no-drive range to the drive range, if the clutch output rotation speed condition indicating that the primary rotation speed Npri at the start of selection of the drive range exceeds the threshold value Npth is satisfied, execution of the abnormality diagnosis of the selection solenoid valve 75 is not permitted.

That is, in the case where, during vehicle stop, the range-change of D-range→N-range→D-range or R-range→N-range (P-range)→R-range (since this is the selecting operation of "the drive range"→"the no-drive range"→"the drive range in which the travel clutch, which is the same as the travel clutch engaged in the drive range before changing to the no-drive range, is engaged", the range-change includes L-range→N-range→L-range, L-range→N-range→D-range and D-range→N-range→L-range) is done by a normal selecting operation, if "the no-drive range selection time≥the setting time Tth" is judged at step S2, but "the primary rotation speed Npri>the threshold value Npth" is judged at step S3 in FIG. 4, the routine proceeds in an order of step S1→step S2→step S3→step S6→END. At step S6, the abnormality diagnosis of the selection solenoid valve 75, which is executed at step S7, is not permitted.

That is, if the clutch operating point (Nt, Npri) at the start of selection of the drive range is positioned in the region F where the abnormality judgment is impossible shown in FIG. 10, "the primary rotation speed Npri>the threshold value Npth" is judged, and the abnormality diagnosis of the selection solenoid valve 75 is not permitted. Consequently, when the clutch operating point (Nt, Npri) at the start of selection of the drive range is positioned in the region F where the abnormality judgment is impossible, the misjudgment of the maximum hydraulic pressure side abnormality of the selection solenoid valve 75 is prevented.

In the embodiment, when performing the selecting operation from the no-drive range to the drive range, if the first clutch input rotation speed condition indicating that the turbine rotation speed Nt at the start of selection of the drive range exceeds the first setting value Nt1 is satisfied, execution of the abnormality diagnosis of the selection solenoid valve 75 is not permitted.

That is, in the case where, during vehicle stop, the range-change of D-range→N-range→D-range or R-range→N-range (P-range)→R-range is done by a normal selecting operation and "the primary rotation speed Npri≤the threshold value Npth" is established, if "the no-drive range selection time≥the setting time Tth" is judged at step S2 and "the primary rotation speed Npri≤the threshold value Npth" is judged at step S3, but "the turbine rotation speed Nt>the first setting value Nt1" is judged at step S4 in FIG. 4, the routine proceeds in an order of step S1→step S2→step S3→step S4→step S6→END. At step S6, the abnormality diagnosis of the selection solenoid valve 75, which is executed at step S7, is not permitted.

That is, if the clutch operating point (Nt, Npri) at the start of selection of the drive range is positioned in the region G where there is a strong possibility that "normal" will be misjudged even in a case of "abnormal" shown in FIG. 10, "the turbine rotation speed Nt>the first setting value Nt1" is judged, and the abnormality diagnosis of the selection solenoid valve 75 is not permitted. Consequently, when the clutch operating point (Nt, Npri) at the start of selection of the drive range is positioned in the region G where there is a strong possibility that "normal" will be misjudged even in a case of "abnormal", the misjudgment of the maximum hydraulic pressure side abnormality of the selection solenoid valve 75 is prevented.

Here, when "the turbine rotation speed Nt>the first setting value Nt1" is judged, since there is a risk of interference with other controls, an engagement time by a selection control cannot be correctly determined. For instance, in a case of a racing selecting operation (an N→D operation with a large accelerator opening APO in N-range), since a protection control such as limitation on the turbine rotation speed and limitation on an engine torque works, the engagement time by the selection control cannot be correctly determined. Therefore, even if the interference with other controls exists, the misjudgment of the maximum hydraulic pressure side abnormality of the selection solenoid valve 75 is prevented.

In the embodiment, when performing the selecting operation from the no-drive range to the drive range, if the second clutch input rotation speed condition indicating that the turbine rotation speed Nt at the start of selection of the drive range is less than the second setting value Nt2 that is lower than the first setting value Nt1 is satisfied, execution of the abnormality diagnosis of the selection solenoid valve 75 is not permitted.

That is, in the case where, during vehicle stop, the range-change of D-range→N-range→D-range or R-range→N-range (P-range)→R-range is done by a normal selecting operation and "the primary rotation speed Npri≤the threshold value Npth" is established and "the turbine rotation speed Nt≤the first setting value Nt1" is established, if "the no-drive range selection time≥the setting time Tth" is judged at step S2 and "the primary rotation speed Npri<the threshold value Npth" is judged at step S3 and also "the turbine rotation speed Nt≤the first setting value Nt1" is judged at step S4, but "the turbine rotation speed Nt<the second setting value Nt2" is judged at step S5 in FIG. 4, the routine proceeds in an order of step S→step S2→step S3→step S4→step S5→step S6→END. At step S6, the abnormality diagnosis of the selection solenoid valve 75, which is executed at step S7, is not permitted.

That is, if the clutch operating point (Nt, Npri) at the start of selection of the drive range is positioned in the region H where there is a strong possibility that "abnormal" will be misjudged even in a case of "normal" shown in FIG. 10, "the turbine rotation speed Nt<the second setting value Nt2" is judged, and the abnormality diagnosis of the selection solenoid valve 75 is not permitted. Consequently, when the clutch operating point (Nt, Npri) at the start of selection of the drive range is positioned in the region H where there is a strong possibility that "abnormal" will be misjudged even in a case of "normal", the misjudgment of the maximum hydraulic pressure side abnormality of the selection solenoid valve 75 is prevented.

Here, the reason why the misjudgment of the maximum hydraulic pressure side abnormality of the selection solenoid valve 75 occurs when the clutch operating point (Nt, Npri) is in the region H is because the engagement of the travel clutch is completed in a short time due to the fact that the clutch operating point (Nt, Npri) is close to the threshold value Ntth, then even if the selection solenoid valve 75 is normal, there is a case where the abnormality judgment condition of "the selection lag time Ts<the predetermined time ΔT" is established.

Next, effects will be explained.

The selection solenoid valve abnormality diagnosing device of the belt-type continuously variable transmission CVT of the embodiment obtains the following effects.

(1) The selection solenoid valve abnormality diagnosing device has an automatic transmission (a belt-type continuously variable transmission CVT), a selection solenoid valve 75 and a selection solenoid valve abnormality diagnosing unit 8a.

The automatic transmission (the belt-type continuously variable transmission CVT) is provided between a travelling driving source (an engine 1) and driving wheels 6.

The selection solenoid valve 75 controls engagement/disengagement of a travel clutch (a forward clutch 31, a reverse brake 32) in synchronization with a selecting operation of a selector lever 90 that selects a range position of the automatic transmission (the belt-type continuously variable transmission CVT).

The selection solenoid valve abnormality diagnosing unit 8a is configured to, if a time required for the travel clutch (the forward clutch 31, the reverse brake 32) to be judged to be engaged from a start of selection of the drive range is less than a predetermined time, judge the selection solenoid valve 75 to be a maximum hydraulic pressure side abnormality (step S7→step S9 in FIG. 4).

The selection solenoid valve abnormality diagnosing unit 8a is configured such that when performing the selecting operation of the drive range→the no-drive range→the drive range (the drive range in which the travel clutch, which is the same as the travel clutch engaged in the drive range before changing to the no-drive range, is engaged), if a selecting operation speed condition indicating that a no-drive range selection time is shorter than a setting time Tth is satisfied, execution of abnormality diagnosis of the selection solenoid valve 75 is not permitted (step S2→step S6 in FIG. 4).

Therefore, when the selecting operation by which the selector lever crosses the no-drive range is performed in a short time, the misjudgment of the maximum hydraulic pressure side abnormality of the selection solenoid valve 75 can be prevented.

(2) The selection solenoid valve abnormality diagnosing unit 8a is configured to, when performing the selecting operation from the no-drive range to the drive range, if a selection lag time Ts required for a travel clutch input rotation speed (a turbine rotation speed Nt) to become a threshold value Ntth or less from the start of the selection of the drive range is less than a predetermined time ΔT, judge the selection solenoid valve 75 to be the maximum hydraulic pressure side abnormality (step S7→step S9 in FIG. 4).

Therefore, in addition to an effect of (1), when the selecting operation by which the selector lever crosses the no-drive range is performed in a short time, the misjudgment can be prevented without changing the abnormality diagnosis method according to whether the selection lag time Ts is less than the predetermined time ΔT or not.

(3) The selection solenoid valve abnormality diagnosing unit 8a is configured such that when performing the selecting operation from the no-drive range to the drive range, if a clutch output rotation speed condition indicating that a travel clutch output rotation speed (a primary rotation speed Npri) at the start of the selection of the drive range exceeds a threshold value Npth is satisfied, execution of the abnormality diagnosis of the selection solenoid valve 75 is not permitted (step S3→step S6 in FIG. 4).

Therefore, in addition to an effect of (2), when a clutch operating point (Nt, Npri) at the start of selection of the drive range is positioned in a region F where the abnormality judgment is impossible, the misjudgment of the maximum hydraulic pressure side abnormality of the selection solenoid valve 75 is prevented.

(4) The selection solenoid valve abnormality diagnosing unit 8*a* is configured such that when performing the selecting operation from the no-drive range to the drive range, if a first clutch input rotation speed condition indicating that the travel clutch input rotation speed (the turbine rotation speed Nt) at the start of the selection of the drive range exceeds a first setting value Nt1 is satisfied, execution of the abnormality diagnosis of the selection solenoid valve 75 is not permitted (step S4→step S6 in FIG. 4).

Therefore, in addition to an effect of (2) or (3), when the clutch operating point (Nt, Npri) at the start of selection of the drive range is positioned in the region G where there is a strong possibility that "normal" will be misjudged even in a case of "abnormal", the misjudgment of the maximum hydraulic pressure side abnormality of the selection solenoid valve 75 is prevented.

(5) The selection solenoid valve abnormality diagnosing unit 8*a* is configured such that when performing the selecting operation from the no-drive range to the drive range, if a second clutch input rotation speed condition indicating that the travel clutch input rotation speed (the turbine rotation speed Nt) at the start of the selection of the drive range is less than a second setting value Nt2 that is lower than the first setting value Nt1 is satisfied, execution of the abnormality diagnosis of the selection solenoid valve 75 is not permitted (step S5→step S6 in FIG. 4).

Therefore, in addition to an effect of (4), when the clutch operating point (Nt, Npri) at the start of selection of the drive range is positioned in the region H where there is a strong possibility that "abnormal" will be misjudged even in a case of "normal", the misjudgment of the maximum hydraulic pressure side abnormality of the selection solenoid valve 75 is prevented.

Although the selection solenoid valve abnormality diagnosing device of the automatic transmission according to the present invention has been explained on the basis of the above embodiment, a specified configuration of the present invention is not limited to that in the above embodiment. The configuration includes all design modifications and equivalents belonging to the technical scope of the present invention.

The above embodiment shows that when performing the selecting operation from the no-drive range to the drive range, if the selection lag time Ts required for the turbine rotation speed Nt to become the threshold value Ntth or less from the start of selection of the drive range is less than the predetermined time ΔT, the selection solenoid valve 75 is judged to be the maximum hydraulic pressure side abnormality. However, as the judgment of the maximum hydraulic pressure side abnormality of the selection solenoid valve, the abnormality could be judged, if a time required for a clutch rotation speed difference to become a predetermined rotation speed difference from the start of selection of the drive range or a time required for the clutch rotation speed difference to become zero (a full engagement) is less than a predetermined time.

In the above embodiment, the selection solenoid valve abnormality diagnosing device of the present invention is applied to the engine vehicle mounting therein the belt-type continuously variable transmission CVT as the automatic transmission. However, the selection solenoid valve abnormality diagnosing device of the present invention can be applied to a vehicle mounting therein a multi-range transmission called step-AT or a vehicle mounting therein a continuously variable transmission with an auxiliary transmission. Further, as the vehicle to which the selection solenoid valve abnormality diagnosing device is applied, the vehicle is not limited to the engine vehicle, but could be a hybrid vehicle having an engine and a motor as a travelling driving source or an electric vehicle having a motor as a travelling driving source.

The invention claimed is:

1. A selection solenoid valve abnormality diagnosing device of an automatic transmission comprising:

the automatic transmission provided between a travelling driving source and driving wheels;

a selection solenoid valve controlling engagement/disengagement of a travel clutch in synchronization with a selecting operation of a selector lever that selects a range position of the automatic transmission; and a selection solenoid valve abnormality diagnosing unit configured to, when performing the selecting operation from a no-drive range to a drive range, if a time required for the travel clutch to be judged to be engaged from a start of selection of the drive range is less than a predetermined time, judge the selection solenoid valve to be a maximum hydraulic pressure side abnormality, and the selection solenoid valve abnormality diagnosing unit being configured such that when performing the selecting operation of "the drive range"→"the no-drive range"→"the drive range in which the travel clutch, which is the same as the travel clutch engaged in the drive range before changing to the no-drive range, is engaged", if a selecting operation speed condition indicating that a no-drive range selection time is shorter than a setting time is satisfied, execution of abnormality diagnosis of the selection solenoid valve is not permitted.

2. The selection solenoid valve abnormality diagnosing device of the automatic transmission as claimed in claim 1, wherein:

the selection solenoid valve abnormality diagnosing unit is configured to, when performing the selecting operation from the no-drive range to the drive range, if a selection lag time required for a travel clutch input rotation speed to become a threshold value or less from the start of the selection of the drive range is less than a predetermined time, judge the selection solenoid valve to be the maximum hydraulic pressure side abnormality.

3. The selection solenoid valve abnormality diagnosing device of the automatic transmission as claimed in claim 2, wherein:

the selection solenoid valve abnormality diagnosing unit is configured such that when performing the selecting operation from the no-drive range to the drive range, if a clutch output rotation speed condition indicating that a travel clutch output rotation speed at the start of the selection of the drive range exceeds a threshold value is satisfied, execution of the abnormality diagnosis of the selection solenoid valve is not permitted.

4. The selection solenoid valve abnormality diagnosing device of the automatic transmission as claimed in claim 2, wherein:

the selection solenoid valve abnormality diagnosing unit is configured such that when performing the selecting operation from the no-drive range to the drive range, if a first clutch input rotation speed condition indicating that the travel clutch input rotation speed at the start of the selection of the drive range exceeds a first setting value is satisfied, execution of the abnormality diagnosis of the selection solenoid valve is not permitted.

5. The selection solenoid valve abnormality diagnosing device of the automatic transmission as claimed in claim 4, wherein:

the selection solenoid valve abnormality diagnosing unit is configured such that when performing the selecting operation from the no-drive range to the drive range, if a second clutch input rotation speed condition indicating that the travel clutch input rotation speed at the start of the selection of the drive range is less than a second setting value that is lower than the first setting value is satisfied, execution of the abnormality diagnosis of the selection solenoid valve is not permitted.

6. A method of diagnosing abnormality of a selection solenoid valve that controls engagement/disengagement of a travel clutch in synchronization with a selecting operation of a selector lever that selects a range position of an automatic transmission provided between a travelling driving source and driving wheels, the method comprising:

when performing the selecting operation from a no-drive range to a drive range, if a time required for the travel clutch to be judged to be engaged from a start of selection of the drive range is less than a predetermined time, judging the selection solenoid valve to be a maximum hydraulic pressure side abnormality; and when performing the selecting operation of "the drive range"→"the no-drive range"→"the drive range in which the travel clutch, which is the same as the travel clutch engaged in the drive range before changing to the no-drive range, is engaged", if a no-drive range selection time is shorter than a setting time, not permitting execution of abnormality diagnosis of the selection solenoid valve at the selecting operation from the no-drive range to the drive range.

* * * * *